US009004706B1

(12) United States Patent
Banfield

(10) Patent No.: US 9,004,706 B1
(45) Date of Patent: Apr. 14, 2015

(54) OUTDOOR SPEAKER AND ILLUMINATION TOWER

(71) Applicant: James Banfield, Brunswick, ME (US)

(72) Inventor: James Banfield, Brunswick, ME (US)

( * ) Notice: Subject to any disclaimer, the term of this patent is extended or adjusted under 35 U.S.C. 154(b) by 83 days.

(21) Appl. No.: 13/760,433

(22) Filed: Feb. 6, 2013

Related U.S. Application Data

(60) Provisional application No. 61/595,409, filed on Feb. 6, 2012.

(51) Int. Cl.
*H04M 1/22* (2006.01)
*F21V 33/00* (2006.01)

(52) U.S. Cl.
CPC .................................. *F21V 33/0056* (2013.01)

(58) Field of Classification Search
CPC ............................ F21V 33/0056; H04R 1/028
USPC ........................................................... 362/86
See application file for complete search history.

(56) References Cited

U.S. PATENT DOCUMENTS

| | | | | |
|---|---|---|---|---|
| 4,953,223 | A * | 8/1990 | Householder | 381/387 |
| 5,677,669 | A * | 10/1997 | Walkley et al. | 340/473 |
| 7,066,613 | B2 * | 6/2006 | Vishwamitra | 362/86 |
| 7,237,648 | B2 * | 7/2007 | Lee et al. | 181/199 |
| 2006/0209530 | A1 * | 9/2006 | Schaak | 362/86 |
| 2012/0294014 | A1 * | 11/2012 | Harwood | 362/311.06 |

* cited by examiner

*Primary Examiner* — Stephen F Husar
(74) *Attorney, Agent, or Firm* — Patricia M. Mathers

(57) ABSTRACT

A combination speaker and lighting tower for use outdoors. The lighting tower has a base and a housing that includes at least one lamp. A rotatable coupler is used to mount a speaker unit on the tower, which allows the speaker unit to rotate in a horizontal plane. A stop is provided in the coupler to prevent the speaker unit from rotating a full 360 degrees. The speaker unit may be fixed to a specific location or allowed to oscillate back and forth. The lighting tower may be installed on a patio or anchored in the ground.

3 Claims, 4 Drawing Sheets

OUTDOOR SPEAKER AND ILLUMINATION TOWER

BACKGROUND INFORMATION

Field of the Invention

The invention relates to the field of sound system speakers and landscape lighting. More particularly, the invention relates to an all weather speaker tower with illumination devices for outdoor use.

BRIEF SUMMARY OF THE INVENTION

The invention is a combination speaker and lighting tower or bollard for outdoor use. The bollard according to the invention includes a lighting tower with one or more illumination devices and a speaker unit rotatably mounted on the lighting tower, so that sound may be directed in a particular direction. One intended use of the combination speaker and lighting bollard is as an outdoor sound speaker, so that one can listen to music out on the patio or in the backyard, etc.

A stop is provided in the bollard, to prevent the speaker unit from rotating a full 360 degrees and more, to avoid tangling any wires to the speaker unit. The illumination devices are provided to illuminate the surrounding terrain and/or landscaping, buildings, or the ambient surroundings, depending on the number and placement of the devices. Many embodiments of the combination speaker and lighting according to the invention are conceivable. One suggested embodiment includes two illumination devices that are placed such, that one is oriented downward and outward and illuminates the ground in the vicinity of the bollard and a second one is oriented upward and outward and illuminates an area of visual interest, perhaps the landscaping, the seating or grill area, or a garden, etc.

The bollard has a base, which allows it to be mounted to a flat surface, such as a patio deck. The base may also be provided with a ground stake, in order to anchor the bollard in the ground.

BRIEF DESCRIPTION OF THE DRAWINGS

The present invention is described with reference to the accompanying drawings. In the drawings, like reference numbers indicate identical or functionally similar elements. The drawings are not drawn to scale.

DETAILED DESCRIPTION OF THE INVENTION

The present invention will now be described more fully in detail with reference to the accompanying drawings, in which the preferred embodiments of the invention are shown. This invention should not, however, be construed as limited to the embodiments set forth herein; rather, they are provided so that this disclosure will be complete and will fully convey the scope of the invention to those skilled in the art.

Figure 1:
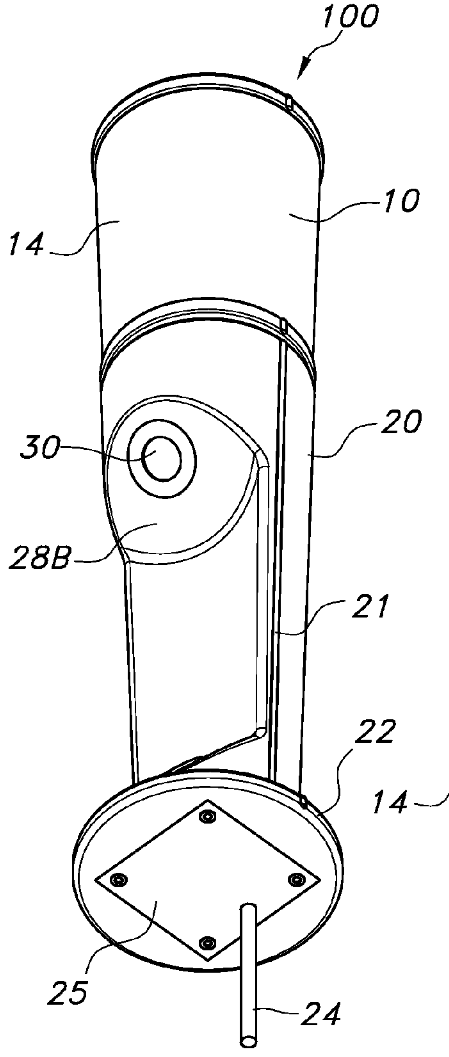
FIG. 1 perspective view of the combination speaker and lighting bollard according to the invention, showing the front and the bottom of the tower.
Figure 2:
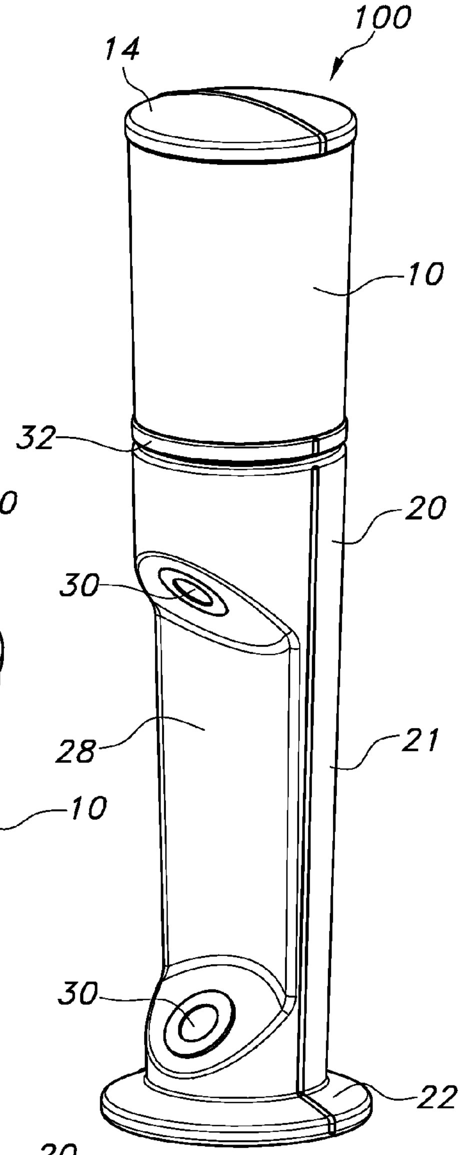
FIG. 2 is an elevation view of the bollard in its upright position.
Figure 3:
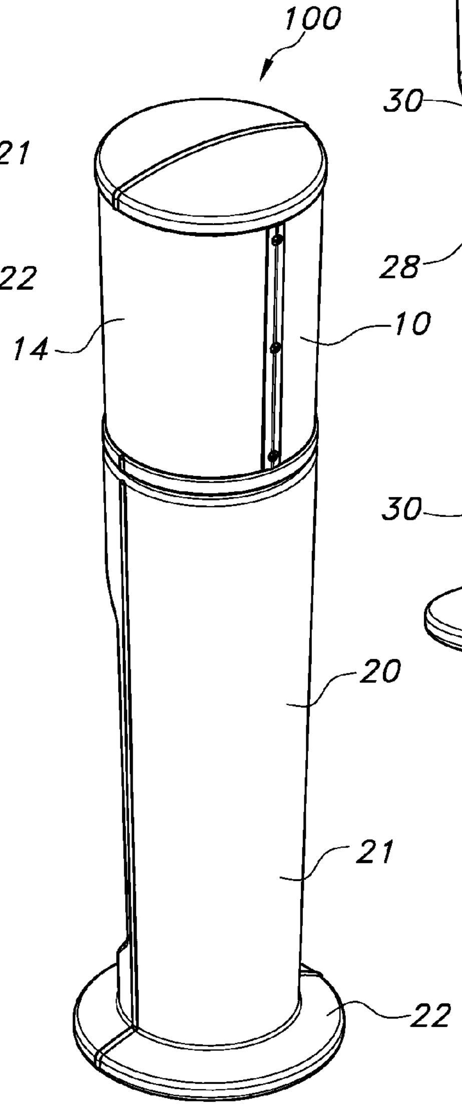
FIG. 3 is a rear view of the bollard.

FIGS. 1-3 illustrate a combination speaker and lighting tower or bollard 100 according to the invention. This bollard 100 comprises a speaker unit 10 mounted on a lighting tower 20. The speaker unit 10 includes at least one speaker driver 12 enclosed in a speaker housing 14. The lighting tower 20 has a housing 21 and a base 22 and includes at least one illumination device 30.

FIG. 1 is a perspective view of the bollard 100, showing the underside of the base 22. This particular embodiment is intended to be anchored in the ground and an anchor or stake 24 is fastened to the base. FIGS. 1 and 2 illustrate an embodiment with two illumination devices 30, the upper one intended for illumination of the nearby terrain and the lower one for providing general ambient lighting. FIG. 3 illustrates the back of the device, which, in this embodiment includes no illumination devices. The combination speaker and lighting 100 may be constructed in different embodiments, depending on the intended use and it is understood that it is within the scope of the invention to install additional illumination devices 30 in the tower 20.

Figure 4:
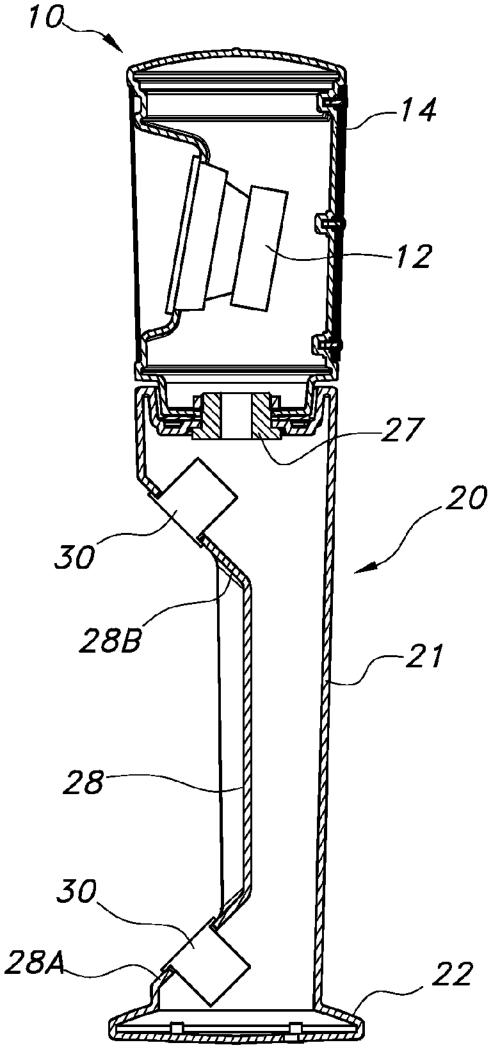
FIG. 4 illustrates the internal components of the bollard, and particularly showing the placement of the speaker driver and the illumination devices.
Figure 5:
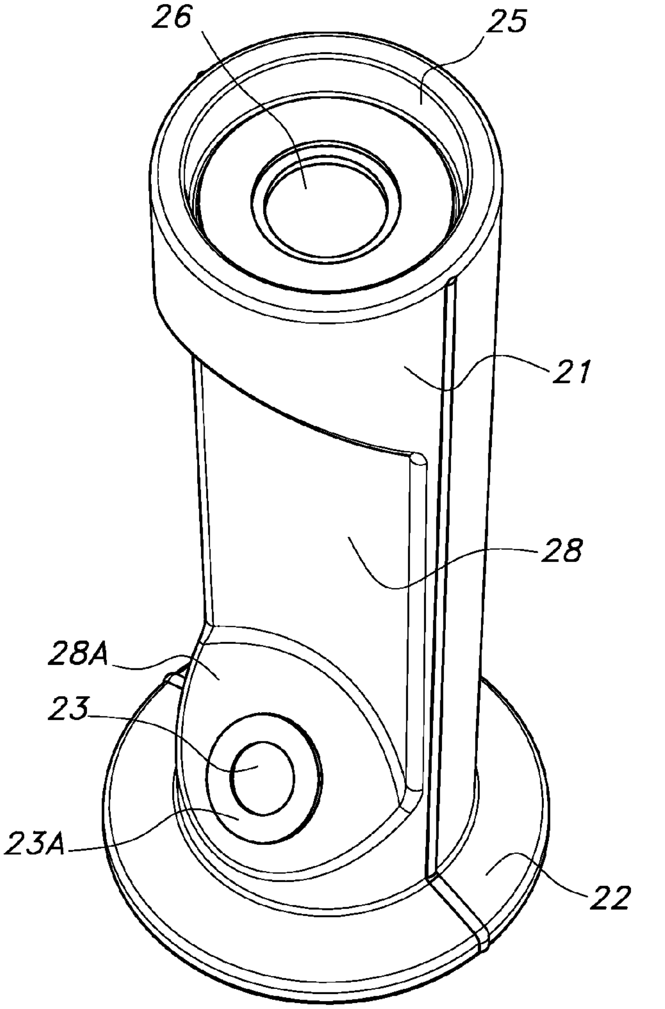
FIG. 5 is a perspective view of the tower, showing an aperture for receiving an illumination device and the upper portion that receives the speaker housing.

FIG. 4-7 illustrate the various components and structural features of the lighting tower 20 and the speaker unit 10. FIG. 4 is a cut-away view of the bollard 100, showing the components contained within the speaker unit 10 and the lighting tower 20. FIG. 5 illustrates the body of the tower housing 21, which includes a recess 25 for receiving the speaker housing 14. An aperture 26 is provided in the floor of the recess for receiving a coupler 27. The housing 21 has a recessed face 28, bounded by a lower face 28B and an upper face 28A. An aperture 23 is provided in the upper and lower faces for receiving the illumination device 30. Depending on the particular light fixture selected for use as the illumination device 30, a mounting flange 23A may be provided around the aperture 23 for seating the illumination device 30.

Figure 8:
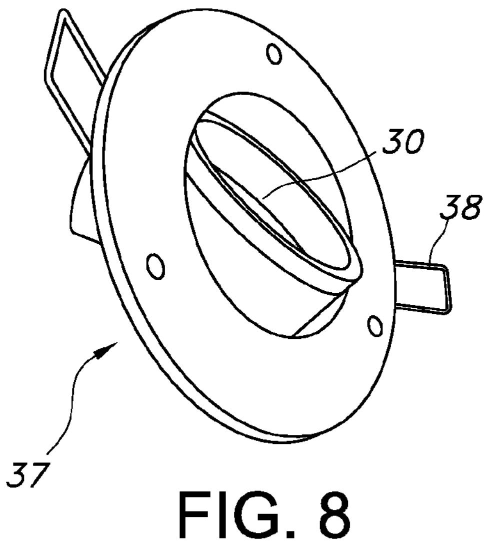
FIG. 8 illustrates a swivel lamp fixture, one type of lamp mounting assembly that can be used.

FIG. 8 illustrates a swivel mounting assembly 37 that allows the illumination device 30 to be swiveled for better coverage and aiming. Any suitable illumination device may be used in the outdoor speaker bollard 100 and examples of suitable LED bulbs include the Sylvania 78643 6 Watt dimmable flood LED bulb or the MR16 5 Watt Natural White Cree LED 180 bulb. Other light bulbs may also be used, of course, but a waterproof LED fixture is particularly well suited for outdoor use. The rear of the LED lamp has connector pins that plug into a conventional socket that is provided in the housing. Depending on the particular intended use and location of use, the illumination devices may be powered by a dedicated low voltage power supply, a battery and/or a solar cell. Spring-biased clips 38 may be provided on the fixture 37 to hold it in the housing 21, so that the fixture may be easily removed and re-installed in order to replace the lamp. The fixture 37 may also be fastened with other mechanical fasteners to the housing 21, such as with threaded fasteners. It is understood, however, that it is not necessary to use a swivel fixture. Rather, the mount for the illumination device 30 may be fixed in position.

Figure 6A:
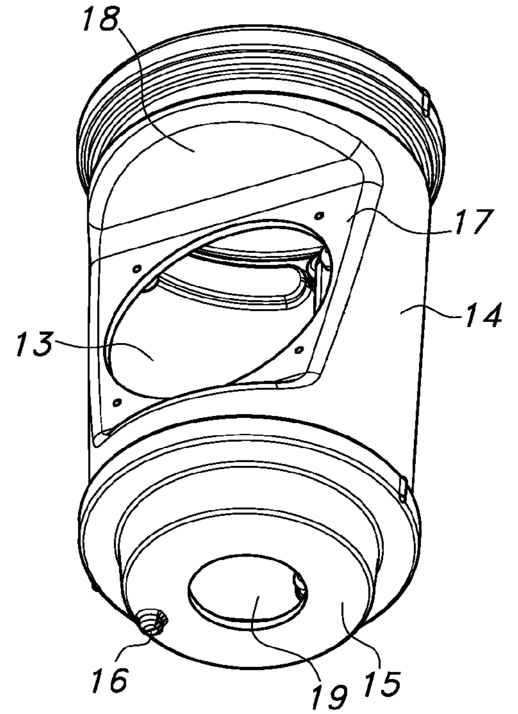
FIG. 6A is a perspective view of the speaker housing, showing the base and the mounting face for the speaker driver.
Figure 6:
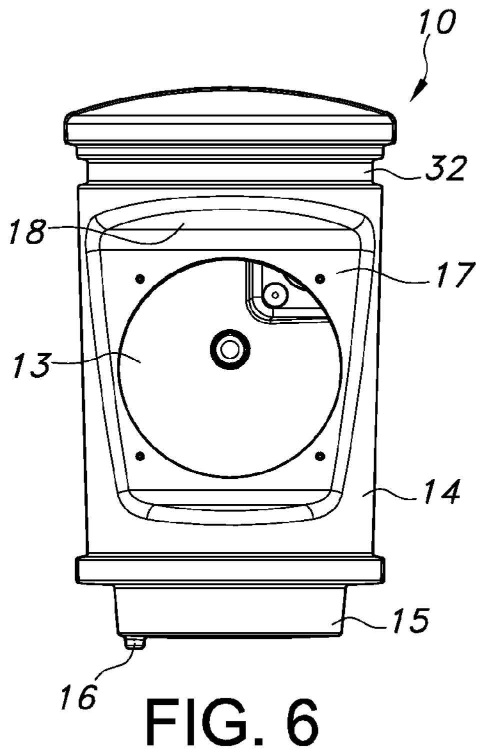
FIG. 6 is a front view of the speaker housing, removed from the lighting tower and with the speaker driver removed.
Figure 7:
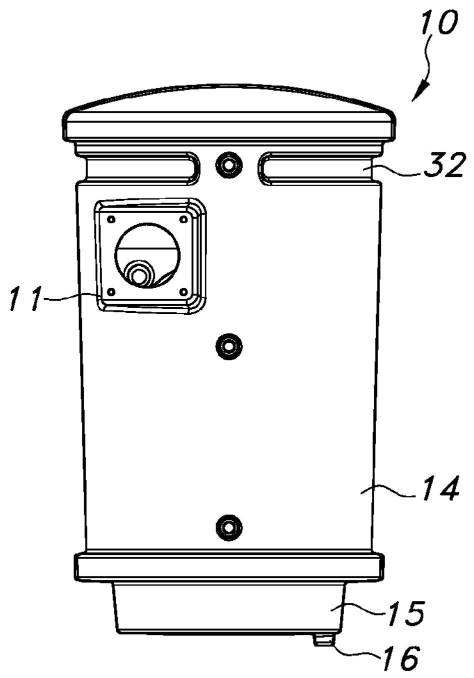
FIG. 7 is a rear view of the speaker housing, removed from the lighting tower and with the back plate that can hold various control and communication devices removed.
Figure 10:
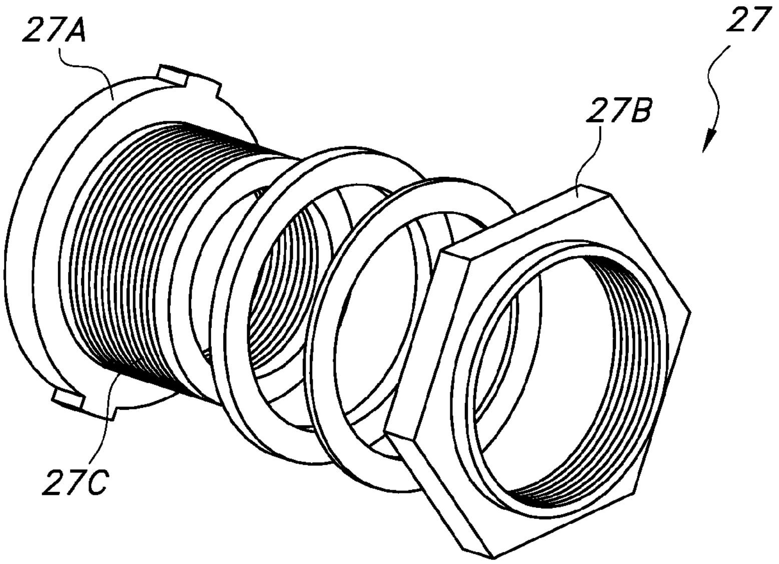
FIG. 10 illustrates a tank fitting.
Figure 9:
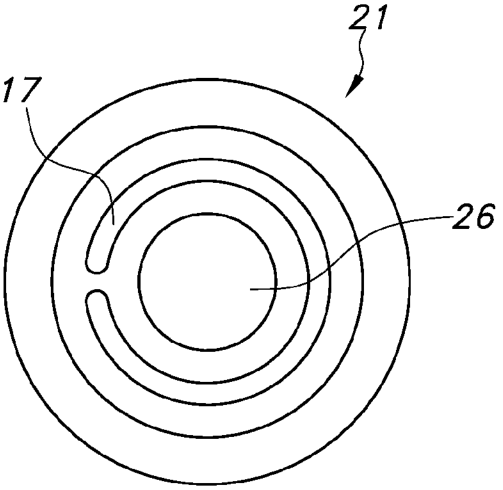
FIG. 9 illustrates the stop groove in the lighting tower.

FIGS. 6, 6A, and 7 illustrate the structural features of the speaker unit 10. A base 15 is formed at the lower end of the body of the housing. The front of the housing 14 has a mounting face 17 and speaker-driver opening 13 for mounting the speaker driver 12. Various types of conventional speakers may be used, including speakers for 360 degree "omnidirectional" sound dispersion. An example of a suitable speaker is a TERRA speaker sold by CAMM, Inc. FIG. 6A is a view of the housing 14 from the bottom, which shows a recess 18 and the inward slant of the mounting face 17, which holds the speaker driver 12 tilted upward. The portion of the housing 14 surrounding at least the front of the speaker driver 12 is constructed of a perforated material. A threaded aperture 19 is formed in the base 15. When assembled, a coupling 27, shown in FIG. 10, is threaded onto the base 15. This coupling 27 extends down into the aperture 26 that is provided on the upper end of the lighting tower 20. The coupling 27 is able to rotate within the aperture 26. A stop 16 is provided on the base 15 of the speaker housing 14 and is movable in a groove 17 that is provided in the top of the lighting tower housing 21, as shown in FIG. 9. The groove 17 is an incomplete circle and the stop and groove cooperate to restrict the rotation of the speaker unit 10 to less than 360 degrees, to prevent the wires connecting the speaker to the power source from becoming twisted. FIG. 7 shows the rear side of the speaker housing 14. A removable plate 11 is provided on the housing 14 to provide access to the electrical circuitry connected to a conventional speaker crossover network and other conventional devices, such as a 70.7 Volt transformer and switch that enable connection to a distributed audio system using this convention. Other various control and communication devices may be mounted on the plate 11 or provided with the housing 14 in an accessible location. FIG. 7 also shows a circumferential groove 32 around the upper portion of the speaker housing 14. An LED light tape or other illumination device may be installed in this recess 32.

Figure 11:
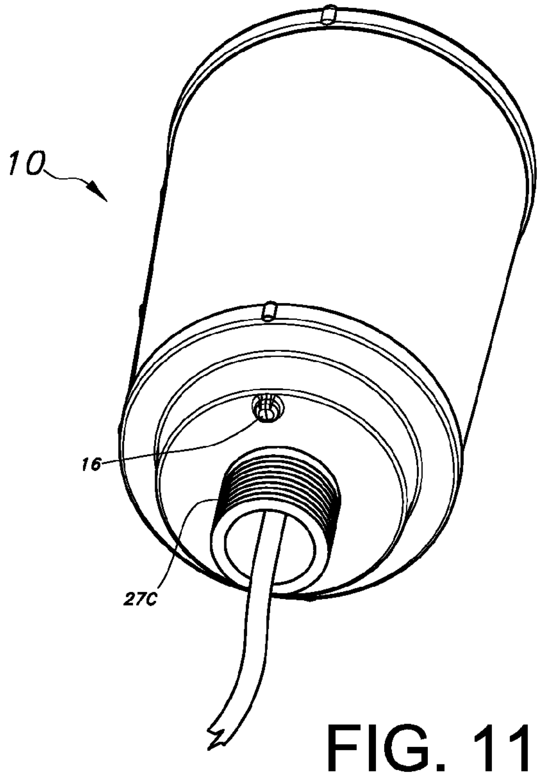
FIG. 11 shows the bottom of the speaker unit, with the tank fitting.

As described above, the coupler 27 is typically described as "a tank fitting" with a nut. FIG. 10 illustrates an example of a suitable tank fitting, the heavy duty polypropylene tank fitting 60403 manufactured by Norwesco and FIG. 11 shows the lower end of the speaker unit 10 with the tank fitting 27. This fitting provides an open passageway between the speaker housing 14 and down through the lighting tower 20, through which electrical cables for the electrical components may be fed. An opening (not shown) is provided in the base 22 for bringing the necessary cables out of the bollard 100, to be connected to audio and lighting power sources. If the bollard 100 is anchored in the ground, a shallow trench may be dug, leading from the anchored position to the power sources, with the appropriate electrical cables laid in the trench or run through burial grade conduit. It is, of course, possible, that the illumination devices be battery and/or solar powered, in which case, the battery is located in an appropriate area that is readily accessible, such as in the vicinity of the plate 11 and the solar energy collector be provided on a suitable surface of the tower. The necessary wiring for the speaker driver 12 and the illumination devices 30 is not disclosed herein in any detail, because a person of skill in the art will readily understand how to wire such devices.

Light tape may also be placed around the tower 20. FIG. 1 illustrates an embodiment of the combination speaker and lighting bollard 100 that is intended to be anchored in the ground. An anchor stake 24 is provided on the underside of the base 22. The stake 24 is affixed to the base 22 by conventional fastening means. In this case, a plate 25 with the stake 24 is fastened to the underside of the base 22. In a free-standing installation, the base 22 may be weighted, to provide sufficient stability to allow the speaker bollard to be placed on a flat surface, such as a patio deck or floor.

The combination speaker and lighting bollard 100 has been described above as a bollard that is placed on the ground or on a flat mounting surface like a deck or patio. It is within the scope of the invention to provide a shorter version of the speaker/lighting bollard that is intended to be mounted on a 4 inch by 4 inch post. With this embodiment, the lower portion of the tower housing 20 is constructed as a hollow rectangular tube that fits over the 4×4 post. The tower housing may be removably or permanently fastened to the post by conventional means.

The various electrical components in the combination speaker and lighting according to the invention 100, for example, the speaker driver 12 and illumination devices 30 including light tape, are commercially available components and the scope of the invention is not limited to the specific components mentioned herein.

It is understood that the embodiments described herein are merely illustrative of the present invention. Variations in the construction of the combination speaker and lighting bollard may be contemplated by one skilled in the art without limiting the intended scope of the invention herein disclosed and as defined by the following claims.

What is claimed is:

1. A combination speaker and lighting tower comprising:
- a lighting tower having a tower housing, a tower base, and at least one illumination device;
- a speaker unit mounted on the lighting tower, the speaker unit including at least one speaker driver enclosed in a speaker housing; and
- an energy source for powering the at least one illumination device and the speaker unit;
- wherein the speaker unit is rotatable independently of the lighting tower in a horizontal plane about a vertical axis defined by the lighting tower.

2. The combination speaker and lighting tower of claim 1, further comprising a speaker unit coupler for rotatably coupling the speaker unit to the lighting tower;
- wherein the lighting tower has an upper end with an aperture and wherein the speaker unit coupler is fastened to the speaker unit and has a protrusion that extends down into the aperture, so as to be rotatable in a horizontal direction.

3. The combination speaker and lighting tower of claim 1, wherein at least one stop is provided on the speaker unit, to limit horizontal rotation of the speaker unit to a rotation that is slightly less than 360 degrees.

* * * * *